(12) United States Patent
Zha

(10) Patent No.: US 11,714,310 B2
(45) Date of Patent: Aug. 1, 2023

(54) DISPLAY DEVICE

(71) Applicant: Wuhan China Star Optoelectronics Technology Co., Ltd., Hubei (CN)

(72) Inventor: Guowei Zha, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 563 days.

(21) Appl. No.: 16/966,202

(22) PCT Filed: Apr. 13, 2020

(86) PCT No.: PCT/CN2020/084396
§ 371 (c)(1),
(2) Date: Jul. 30, 2020

(87) PCT Pub. No.: WO2021/114531
PCT Pub. Date: Jun. 17, 2021

(65) Prior Publication Data
US 2023/0161189 A1    May 25, 2023

(30) Foreign Application Priority Data
Dec. 13, 2019    (CN) .................. 201911284286.X

(51) Int. Cl.
*G02F 1/1335* (2006.01)
*G02F 1/1333* (2006.01)
*G02B 5/18* (2006.01)
*G06V 40/13* (2022.01)
*F21V 8/00* (2006.01)

(52) U.S. Cl.
CPC ..... *G02F 1/133504* (2013.01); *G02B 6/0053* (2013.01); *G02F 1/13338* (2013.01); *G02F 1/133512* (2013.01); *G06V 40/13* (2022.01); *G02B 5/1866* (2013.01)

(58) Field of Classification Search
CPC .... G02B 5/1866; G02B 6/0053; G06V 40/13; G02F 1/133512; G02F 1/13338; G02F 1/133504
See application file for complete search history.

(56) References Cited

U.S. PATENT DOCUMENTS

| 2011/0157097 A1* | 6/2011 | Hamada | ................ G06F 3/0421 |
| | | | 345/175 |
| 2017/0199420 A1* | 7/2017 | Shin | ....................... G02B 30/33 |

FOREIGN PATENT DOCUMENTS

| CN | 105844212 | 8/2016 |
| CN | 107238961 | 10/2017 |
| CN | 108153027 | 6/2018 |
| CN | 109716352 | 5/2019 |
| CN | 109752873 | 5/2019 |
| CN | 110047872 | 7/2019 |

(Continued)

*Primary Examiner* — Mariam Qureshi

(57) ABSTRACT

A display device is provided. The display device includes a backlight module with a reverse prism structure disposed on top, and a display module disposed above the backlight module. The display module includes a display panel and a sensor component. The sensor component is embedded in the display panel. The sensor component includes a plurality of sensors. A plurality of diffraction gratings are disposed on surfaces of the plurality of sensors. A grating direction of the plurality of diffraction gratings is perpendicular to a grating direction of the reverse prism structure.

20 Claims, 3 Drawing Sheets

(56) References Cited

FOREIGN PATENT DOCUMENTS

| | | |
|---|---|---|
| CN | 110147009 | 8/2019 |
| CN | 110208982 | 9/2019 |
| CN | 110263773 | 9/2019 |
| CN | 110426888 | 11/2019 |
| CN | 110501833 | 11/2019 |
| CN | 110501839 | 11/2019 |
| EP | 3537189 | 9/2019 |
| TW | M587287 | 12/2019 |
| WO | WO 2013/102759 | 7/2013 |

* cited by examiner

DISPLAY DEVICE

RELATED APPLICATIONS

This application is a National Phase of PCT Patent Application No. PCT/CN2020/084396 having International filing date of Apr. 13, 2020, which claims the benefit of priority of Chinese Patent Application No. 201911284286.X filed on Dec. 13, 2019. The contents of the above applications are all incorporated by reference as if fully set forth herein in their entirety.

FIELD AND BACKGROUND OF THE INVENTION

The present disclosure relates to the field of display technology, and particularly relates to a display device.

Currently, mainstream display panels include liquid crystal display (LCD) panels and organic light emitting diode (OLED) displays. Wherein, LCD is a passive light emitting technology that needs irradiation of a backlight module to make a liquid crystal cell realize control of brightness or darkness of light.

As illustrated in FIG. 1, in an LCD in-display sensing solution, collimation backlights are mainly used. Part of display light having a certain collimation characteristic is reflected at a crest of a finger 20' and then enters into a glass cover plate 100 to form reflected light 101. The reflected light 101 has an angle distribution which is same as the display light, that is, has a smaller angle distribution. In a process of collecting fingerprint signals, reflected light of fingerprints of a small angle region can be obtained, thereby having a better signal-to-noise ratio. Another part of light 102 directly penetrates into an air surface from a surface of the cover plate 100. Reflection of the light at this position is not full diffuse scattering, that is, a main direction of the reflected light and an angle distribution of incident light have a certain similarity. However, overall the incident light is dispersed, and noise signals are presented in the process of collecting fingerprint signals. It can be understood that excessive collimation will limit viewing angles of displays, that is, viewing angles are reduced while improving signal-to-noise ratios of current displays.

Therefore, it is necessary to provide a display device to solve a problem existing in the prior art.

SUMMARY OF THE INVENTION

A purpose of the present disclosure is to provide a display device, which is able to improve signal-to-noise ratios and simultaneously enlarges viewing angles.

In order to solve the technical problem mentioned above, the present disclosure provides a display device, which includes:

a backlight module, wherein a reverse prism structure is disposed on top of the backlight module; and a display module disposed above the backlight module, wherein the display module includes a display panel and a sensor component, the sensor component is embedded in the display panel, the sensor component includes a plurality of sensors, a plurality of diffraction gratings are disposed on surfaces of the plurality of sensors, a grating direction of the plurality of diffraction gratings is perpendicular to a grating direction of the reverse prism structure, a material of the plurality of diffraction gratings is an inorganic material, the display panel includes a plurality of pixel units, and the plurality of sensors correspond to the plurality of pixel units.

The present disclosure further provides a display device, including:

a backlight module, wherein a reverse prism structure is disposed on top of the backlight module; and a display module disposed above the backlight module, wherein the display module includes a display panel and a sensor component, the sensor component is embedded in the display panel, the sensor component includes a plurality of sensors, a plurality of diffraction gratings are disposed on surfaces of the plurality of sensors, a grating direction of the plurality of diffraction gratings is perpendicular to a grating direction of the reverse prism structure.

The display device of the present disclosure includes a backlight module, wherein a reverse prism structure is disposed on top of the backlight module; and a display module disposed above the backlight module, wherein the display module includes a display panel and a sensor component, the sensor component is embedded in the display panel, the sensor component includes a plurality of sensors, a plurality of diffraction gratings are disposed on surfaces of the plurality of sensors, and a grating direction of the plurality of diffraction gratings is perpendicular to a grating direction of the reverse prism structure; therefore, a reduction of display viewing angles is prevented while improving the signal-to-noise ratios, thereby and improving display effect and accuracy of signals.

DESCRIPTION OF SPECIFIC EMBODIMENTS OF THE INVENTION

Figure 1:
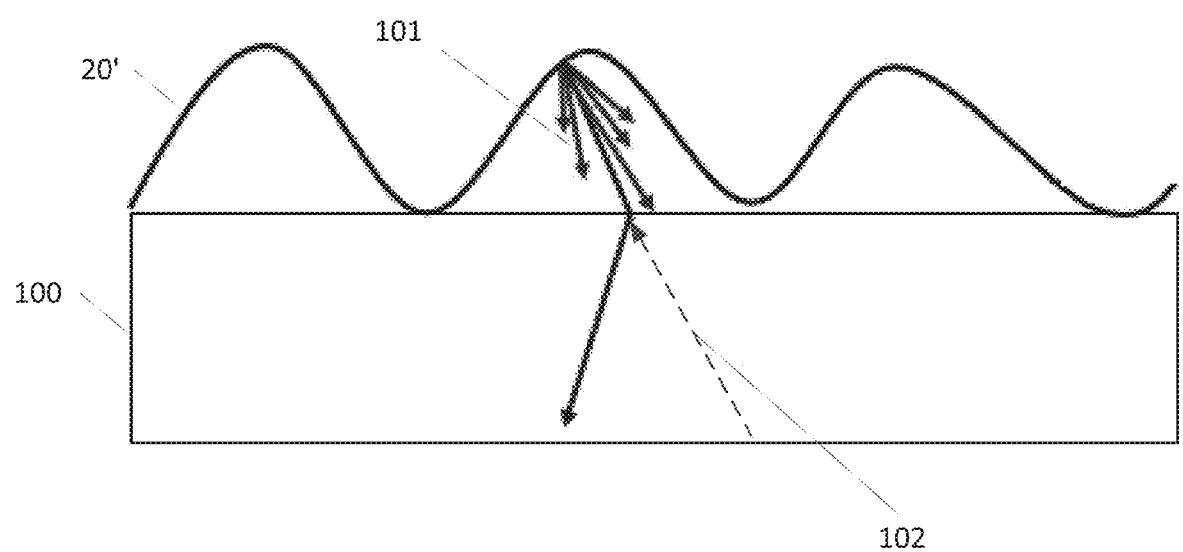
FIG. 1 is a light path schematic diagram of light propagation of an under-screen sensing solution.

The descriptions of embodiments below refer to accompanying drawings in order to illustrate certain embodiments which the present disclosure can implement. The directional terms of which the present disclosure mentions, for example, "top", "bottom", "front", "rear", "left", "right", "inside", "side", etc., only refer to directions of the accompanying figures. Therefore, the used directional terms are for illustrating and understanding the present disclosure, but not for limiting the present disclosure. In the figures, units with similar structures are indicated by the same reference numerals.

Please refer to FIG. 2 to FIG. 5, FIG. 2 is a structural schematic diagram of a display device of the present disclosure.

Figure 2:
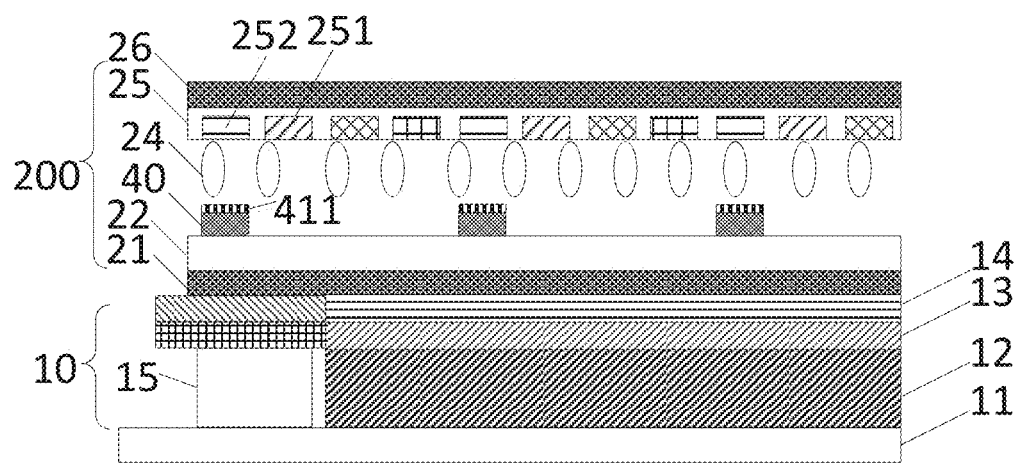
FIG. 2 is a structural schematic diagram of a display device of the present disclosure.

As illustrated in FIG. 2, the display device of the present disclosure includes a backlight module 10 and a display module 200.

A reverse prism structure 14 is disposed on top of the backlight module 10, thereby making an outgoing light angle of an angle of the prism perpendicular to a direction of the reverse prism structure be compressed. In an embodiment, sequentially from bottom to top, the backlight module 10 includes a reflective sheet 11, a light guide plate 12, a diffusion sheet 13, and the reverse prism structure 14. That is, the reverse prism structure 14 is located above the diffusion sheet 13. Furthermore, the reverse prism structure 14 constitutes a one-dimensional backlight structure.

In addition, the backlight module 10 can further include a light source 15. The light source 15 is disposed on a side of the light guide plate 12. In an embodiment, in order to make the angles of the outgoing light compress, a half-intensity angle of light emitted from the backlight module 10 ranges from 10 degrees to 20 degrees. Preferably, the half-intensity angle ranges from 10 degrees to 15 degrees.

The display module 200 is disposed above the backlight module 10. The display module 200 includes a display panel and a sensor component 40.

Furthermore, a sectional structure of the display panel can include a lower polarizer 21, an array substrate 22, a liquid crystal layer 24, a color film substrate 25, and a top polarizer 26, and of course, can also include a cover plate. The color film substrate 25 is located above the array substrate 22. The color film substrate 25 includes a plurality of color resists 251 and a plurality of black matrices 252. Combined with FIG. 3 and FIG. 4, the display panel includes a plurality of pixel units 30. The pixel units include a plurality of subpixels 31 to subpixels 33, for example, red subpixels, green subpixels, and blue subpixels are included.

Figure 3:
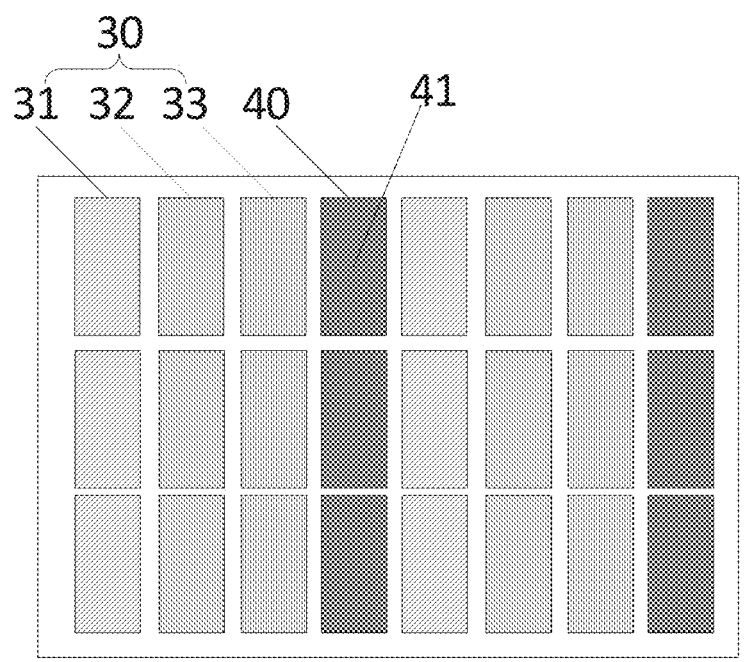
FIG. 3 is a first top view of the display device of the present disclosure.
Figure 4:
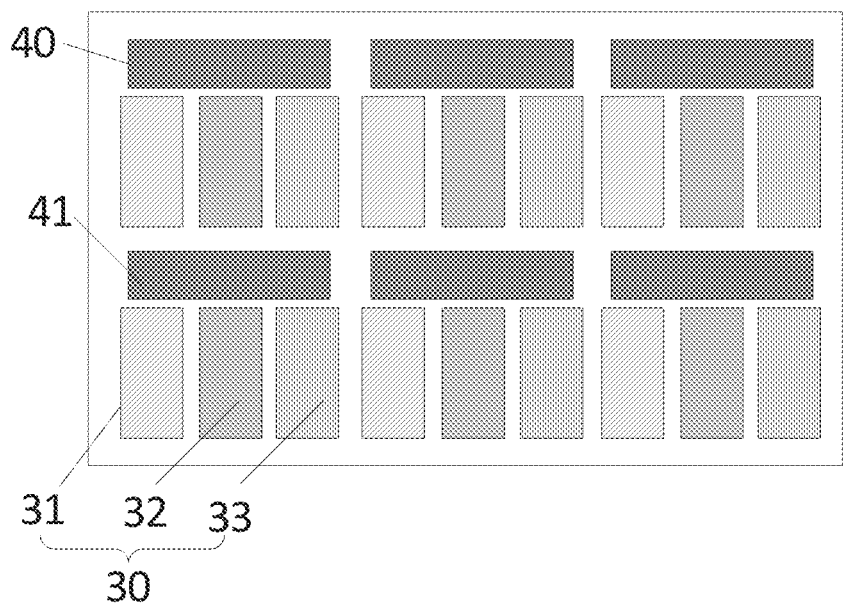
FIG. 4 is a second top view of the display device of the present disclosure.

Combined with FIG. 3 and FIG. 4, the sensor component 40 is embedded in the display panel. In an embodiment, in order to improve the signal-to-noise ratios, the sensor component 40 can be located between the array substrate 22 and the liquid crystal layer 24. In other embodiments, the sensor component 40 is located between the array substrate 22 and the lower polarizer 21, and of course, the sensor component 40 can also be located on an inner surface of a lower base substrate of the color film substrate 25, or the sensor component 40 is located between the color film substrate 25 and the top polarizer 26. It can be understood that configuration manners of the sensor component 40 are not limited thereto.

Combined with FIG. 3 and FIG. 4, the sensor component 40 includes a plurality of sensors 41. A plurality of diffraction gratings 411 are disposed on surfaces of the plurality of sensors 41. Furthermore, the diffraction gratings 411 can be manufactured in a direction of the sensors 41 facing reflected light signals (such as fingerprints) by a nano-imprinting manner. Furthermore, a grating direction of the plurality of diffraction gratings 411 is perpendicular to a grating direction of the reverse prism structure 14.

In an embodiment, in order to further enlarge the display viewing angles, a material of the diffraction gratings 411 is an inorganic material. Furthermore, the material of the plurality of diffraction gratings 411 can include at least one of SiOx, SiNx, or TaOx. In an embodiment, a period of the plurality of diffraction gratings 411 ranges from 100 nm to 1000 nm. In an embodiment, a duty cycle of the plurality of diffraction gratings 411 ranges from 0.3 to 0.8.

In an embodiment, the sensors 41 can correspond to the pixel units 30. As illustrated in FIG. 3, the sensors 41 are parallel to the subpixels 31 to subpixel 33. As illustrated in FIG. 4, the sensors 41 are perpendicular to the subpixels 31 to subpixel 33.

Preferably, positions of the plurality of sensors 41 correspond to positions of the plurality of black matrices 252 located in a first direction, and the first direction is parallel to a plurality of scanning lines. That is, the sensors 41 overlap with the positions of the black matrices in a direction of scanning lines, thereby preventing an aperture ratio from being affected.

In an embodiment, the sensors 41 include at least one of face recognition sensors, distance sensors, light sensors, or three-dimensional sensors.

Figure 5:
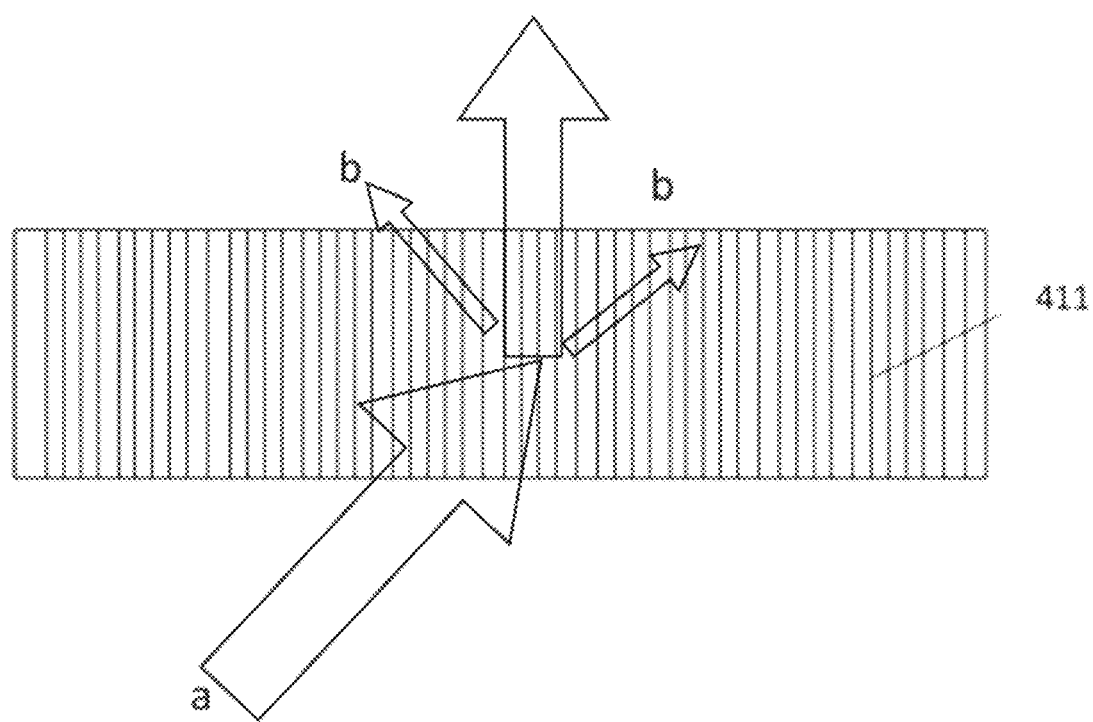
FIG. 5 is a light path schematic diagram of light propagation of the display device of the present disclosure.

As illustrated in FIG. 5, when incident light a with a certain angle distribution passes through the diffraction gratings 411, by diffraction effect of the diffraction gratings 411, light of certain diffraction levels are made to compress into small-angle lights b, and light with other angles is reflected, thereby having collimation-like effect.

Taking the sensor as a fingerprint sensor as an example, because the reverse prism structure is used in the backlight module, the reverse prism structure makes reflected light of fingerprints have a feature of near collimation in one direction, meanwhile prevents full compression of the display viewing angles, and has anti-peep effect in the direction. Because the diffraction gratings are disposed on the surfaces of the fingerprint sensors, and the grating direction of the diffraction gratings is perpendicular to a grating direction of the reverse prism structure, the light entering the surfaces of the diffraction gratings by reflection has an angle filter effect in another direction. Because the diffraction gratings only have patterning structure on the surfaces of the sensors, the display viewing angles in the direction are not affected, that is, the light entering into the sensors by reflection constitute collimation-like structures on two dimensions by the structures mentioned above, which prevents a reduction of display viewing angles while improving the signal-to-noise ratio of the fingerprint signals. That is, a better balance is obtained between the signal-to-noise ratios of the fingerprint signals and the display viewing angles, which improves display effect and accuracy of fingerprint signals, and other signals are similar to this.

The display device of the present disclosure includes a backlight module, wherein a reverse prism structure is disposed on top of the backlight module; and a display module disposed above the backlight module, wherein the display module includes a display panel and a sensor component, the sensor component is embedded in the display panel, the sensor component includes a plurality of sensors, a plurality of diffraction gratings are disposed on surfaces of the plurality of sensors, and a grating direction of the plurality of diffraction gratings is perpendicular to a grating direction of the reverse prism structure. Therefore, a reduction of display viewing angles is prevented while improving the signal-to-noise ratios, thereby improving display effect and accuracy of signals.

In summary, although the present disclosure has disclosed the preferred embodiments as above, however the above-mentioned preferred embodiments are not to limit to the present disclosure. A person skilled in the art can make any change and modification, therefore the scope of protection of the present disclosure is subject to the scope defined by the claims.

What is claimed is:

1. A display device, comprising:
   a backlight module, wherein a reverse prism structure is disposed on top of the backlight module; and
   a display module disposed above the backlight module, wherein the display module comprises a display panel and a sensor component, the sensor component is embedded in the display panel, the sensor component comprises a plurality of sensors, a plurality of diffraction gratings are disposed on surfaces of the plurality of sensors, a grating direction of the plurality of diffraction gratings is perpendicular to a grating direction of the reverse prism structure, a material of the plurality of diffraction gratings is an inorganic material, the display panel comprises a plurality of pixel units, and the plurality of sensors correspond to the plurality of pixel units.

2. The display device as claimed in claim 1, wherein the material of the plurality of diffraction gratings comprises at least one of SiOx, SiNx, or TaOx.

3. The display device as claimed in claim 1, wherein a period of the plurality of diffraction gratings ranges from 100 nm to 1000 nm.

4. The display device as claimed in claim 1, wherein a duty cycle of the plurality of diffraction gratings ranges from 0.3 to 0.8.

5. The display device as claimed in claim 1, wherein a half-intensity angle of light emitted from the backlight module ranges from 10 degrees to 20 degrees.

6. The display device as claimed in claim 1, wherein the display panel comprises a plurality of black matrices, positions of the plurality of sensors correspond to positions of the plurality of black matrices located in a first direction, and the first direction is parallel to a plurality of scanning lines.

7. The display device as claimed in claim 6, wherein the plurality of pixel units comprise a plurality of subpixels, and the plurality of sensors are parallel to or perpendicular to the plurality of subpixels.

8. The display device as claimed in claim 1, wherein sequentially from bottom to top, the backlight module comprises a reflective sheet, a light guide plate, and a diffusion sheet, and the reverse prism structure is located above the diffusion sheet.

9. A display device, comprising:
a backlight module, wherein a reverse prism structure is disposed on top of the backlight module; and
a display module disposed above the backlight module, wherein the display module comprises a display panel and a sensor component, the sensor component is embedded in the display panel, the sensor component comprises a plurality of sensors, a plurality of diffraction gratings are disposed on surfaces of the plurality of sensors, and a grating direction of the plurality of diffraction gratings is perpendicular to a grating direction of the reverse prism structure.

10. The display device as claimed in claim 9, wherein a material of the plurality of diffraction gratings is an inorganic material.

11. The display device as claimed in claim 10, wherein the material of the plurality of diffraction gratings comprises at least one of SiOx, SiNx, or TaOx.

12. The display device as claimed in claim 9, wherein a period of the plurality of diffraction gratings ranges from 100 nm to 1000 nm.

13. The display device as claimed in claim 9, wherein a duty cycle of the plurality of diffraction gratings ranges from 0.3 to 0.8.

14. The display device as claimed in claim 9, wherein a half-intensity angle of light emitted from the backlight module ranges from 10 degrees to 20 degrees.

15. The display device as claimed in claim 9, wherein the display panel comprises a plurality of pixel units, the sensor component comprises a plurality of sensors, and the plurality of sensors correspond to the plurality of pixel units.

16. The display device as claimed in claim 15, wherein the display panel further comprises a plurality of black matrices, positions of the plurality of sensors correspond to positions of the plurality of black matrices located in a first direction, and the first direction is parallel to a plurality of scanning lines.

17. The display device as claimed in claim 15, wherein the plurality of pixel units comprise a plurality of subpixels, and the plurality of sensors are parallel to or perpendicular to the plurality of subpixels.

18. The display device as claimed in claim 9, wherein sequentially from bottom to top, the backlight module comprises a reflective sheet, a light guide plate, and a diffusion sheet, and the reverse prism structure is located above the diffusion sheet.

19. The display device as claimed in claim 9, wherein the plurality of sensors comprise at least one of face recognition sensors, distance sensors, light sensors, or three-dimensional sensors.

20. The display device as claimed in claim 9, wherein the display panel comprises an array substrate, a liquid crystal layer, a color film substrate, a lower polarizer, and a top polarizer, and the color film substrate is located above the array substrate, and
the sensor component is located between the array substrate and the liquid crystal layer.

* * * * *